UNITED STATES PATENT OFFICE.

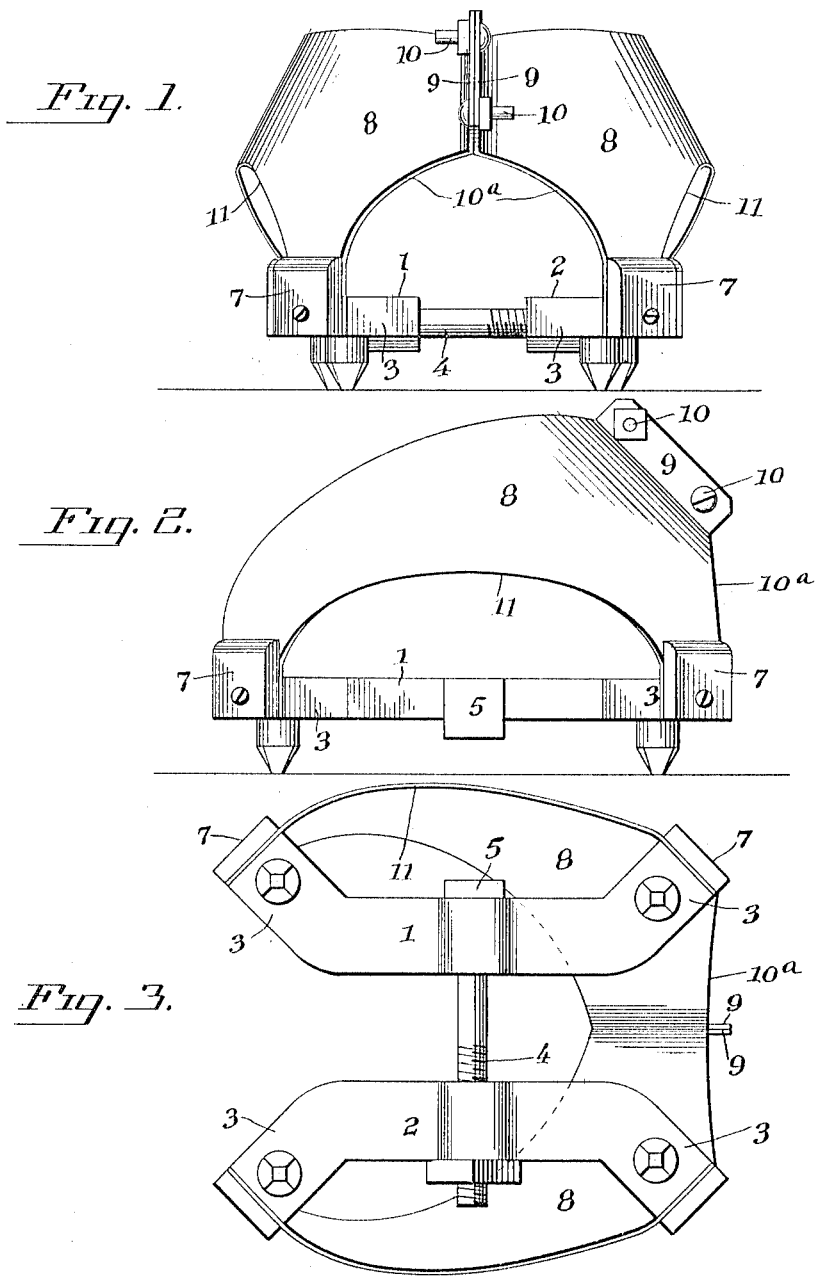

HENRY C. GRIMM, OF PLEASANTVILLE, NEW JERSEY, ASSIGNOR OF ONE-HALF TO H. J. GRIMM, OF PLEASANTVILLE, NEW JERSEY.

OVERSHOE.

1,072,225. Specification of Letters Patent. Patented Sept. 2, 1913.

Application filed May 15, 1912. Serial No. 697,504.

*To all whom it may concern:*

Be it known that I, HENRY C. GRIMM, a citizen of the United States, residing at Pleasantville, in the county of Atlantic and State of New Jersey, have invented new and useful Improvements in Overshoes, of which the following is a specification.

This invention relates to overshoes or ice creepers for horses and the object of the invention is to provide a simple and efficient and cheaply constructed device of this character which may be readily attached to the hoof of an animal so that he may be readily provided in rough weather with a suitable device to prevent slipping.

A further object of the invention is to provide a device of this character which may be readily adjusted to fit any sized hoof.

Further objects of this invention will appear as the following specific description is read in connection with the accompanying drawing, which forms a part of this application, and in which:—

Figure 1 is a front elevation. Fig. 2 is a side elevation. Fig. 3 is a bottom plan view.

Referring more particularly to the drawing, 1 and 2 represent the base members which are provided with diverging ends 3 in which suitable calks are secured. These base members are connected together by a bolt 4 which is passed loosely through one of the members and is threaded into the opposite member, being provided with a head 5 on one end and a lock nut upon the threaded end. The diverging ends 3 have secured thereto suitable lugs 7 which, together with their securing means, hold in place the upper members 8, each having vertical flanges 9 connected together by adjusting bolts 10 which clamp the upper members over the hoof. The upper members are cut away upon their forward portions, as shown at 10$^a$, and upon their sides, as shown at 11, so as to lighten the structure. The bolts 10 are then tightened up so as to clamp the uppers upon the top of the hoof, as will be readily understood. It will thus be seen that I have provided a simple and efficient creeper or overshoe which can be readily attached and detached, as desired.

What is claimed is:—

An overshoe for horses, comprising, companion base members each having alined intermediate portions, one of said portions having a threaded passage therein, the other portion having a passage provided with smooth walls, a bolt passing through both passages and having threaded engagement with the threaded passage whereby to permit both members to be adjusted laterally relatively and also to permit one of the members to be tilted with relation to the other member, forwardly diverging branches extending from the intermediate portions of said base members and provided with integral lugs lying against the front end of an ordinary shoe, rearwardly diverging branches carried by the intermediate portions of the base members and having terminal vertical lugs lying laterally of the first lugs, relatively springy members curved longitudinally throughout and embracing the hoof of the animal and provided with terminal depending portions secured to the lugs of the base members, and means connecting the embracing members with one another at their front ends only and retaining said front ends in confinement against the hoof and operable to effect sliding movements of the base members relatively and thereby cause the embracing members to be drawn laterally into clamping engagement with the hoof and upwardly and forwardly thereover.

In testimony whereof I affix my signature in presence of two witnesses.

HENRY C. GRIMM.

Witnesses:
CHAS. S. LOUTZ,
HARRY J. GRIMM.

---

Copies of this patent may be obtained for five cents each, by addressing the "Commissioner of Patents, Washington, D. C."